United States Patent [19]
Carroll et al.

[11] Patent Number: 5,812,853
[45] Date of Patent: Sep. 22, 1998

[54] METHOD AND APPARATUS FOR PARSING SOURCE CODE USING PREFIX ANALYSIS

[75] Inventors: Martin D. Carroll, Watchung, N.J.; Peter Juhl, Vestbjerg, Denmark; Andrew Richard Koenig, Gillette, N.J.

[73] Assignee: Lucent Technologies Inc., Murray Hill, N.J.

[21] Appl. No.: 225,880

[22] Filed: Apr. 11, 1994

[51] Int. Cl.⁶ .................................................. G06F 9/45
[52] U.S. Cl. ........................................ 395/708; 395/707
[58] Field of Search .................................. 395/700, 705, 395/707, 701; 364/280, 280.4, 280.5

[56] References Cited

U.S. PATENT DOCUMENTS

| | | | |
|---|---|---|---|
| 4,464,650 | 8/1984 | Eastman et al. | 341/51 |
| 4,667,290 | 5/1987 | Goss et al. | 364/300 |
| 5,276,880 | 1/1994 | Platoff et al. | 395/700 |
| 5,313,387 | 5/1994 | McKeeman et al. | 364/400 |
| 5,325,531 | 6/1994 | McKeeman et al. | 395/700 |
| 5,355,493 | 10/1994 | Silberbauer et al. | 395/701 |
| 5,386,570 | 1/1995 | Lindhorst | 395/707 |
| 5,408,603 | 4/1995 | Van De Lavoir et al. | 395/161 |

OTHER PUBLICATIONS

Aho et al., "Compilers Principles, Techniques, and Tools," Addison–Wesley Publishing, Reading, MA, sect's 1.1, 1.2, and 2.4 and pp. 100, 114, 216, and 294, 1988.

Ellis, Margaret A. & Stroustrup, Bjarne, *The Annotated C++ Reference Manual*, Addison–Wesley Publishing Company, AT&T Bell Laboratories, 1990, pp. 26–27.

Franklin, Dan & Legget, Bill, "Lucid Energize Programming System for Sun SPARC," *C++ Report*, Jul./Aug. 1993, pp. 60–63, 65–66.

Murray, Robert B., "A Statically Typed Abstract Representation for C++ Programs," *C++ Technical Conference*, 1992, Usenix Association, pp. 83–97.

*Borland C++ Version 3.0: User's Guide*, Appendix D, pp. 195–199.

*ObjectCenter Reference Version 2*, CenterLine Software, Inc., pp. 241–245.

*Symantec C++ For Windows and DOS: Compiler and Tools Guide*, Symantec Corporation Corporation, 1993, pp. 56–61.

*Microsoft Visual C++ Development System for Windows Version 1.0: Professional Tools User's Guides*, Microsoft Corporation, pp. 88–93.

*Primary Examiner*—Emanuel Todd Voeltz
*Assistant Examiner*—Peter J. Corcoran, III

[57] ABSTRACT

A method and apparatus for processing source code in a language processing system with improved parsing based on prefix analysis. A method in accordance with the present invention includes the steps of identifying a previously-parsed prefix of a source code translation unit; creating a parser in a parser state corresponding to the identified prefix; and parsing a remaining portion of the translation unit after the prefix using the parser in the parser state corresponding to the prefix. In one embodiment of the invention, the step of creating a parser includes retrieving stored level-one subtrees corresponding to the top-level statements in the prefix. The level-one subtrees corresponding to the prefix may be stored in the form of a prefix tree along with the text of the top-level source code statements represented by the prefix and a parser delta indicating the effect of the code statements on the parser state.

25 Claims, 5 Drawing Sheets

FIG. 7
• PREFIX OPTIMIZATION OFF
□ PREFIX OPTIMIZATION ON, FIRST PARSE
○ PREFIX OPTIMIZATION ON, SECOND PARSE

FIG. 8

METHOD AND APPARATUS FOR PARSING SOURCE CODE USING PREFIX ANALYSIS

BACKGROUND OF THE INVENTION

1. Field of the Invention

The present invention relates generally to improvements in compiling source code in computer programs. More particularly, the present invention relates to the use of prefix analysis to improve parsing of source code.

2. Description of Prior Art

In many computer programming environments, compilation involves representing source code in the form of a tree. C and C++ compilers, for example, typically represent source code as a tree with respect to a particular grammar which defines permissible code statements. Other environments use trees that are unrelated to any particular grammar. The latter include, for example, the ALF trees described in R. Murray, "A statically-typed abstract representation for C++ programs," Usenix C++ Conference Proceedings, pages 83–98, August 1992. The term "parse tree" as used herein will refer generally to any tree used to represent source code, regardless of whether or not the tree corresponds to a particular grammar, and the term "parsing" includes the process of generating such a parse tree.

Parsing is a frequent operation in most programming environments, and should therefore be performed as quickly as possible in order to reduce compilation time. Prior art techniques have attempted to reduce parse time by exploiting the fact that for a given sequence of source code statements, a significant initial portion of a corresponding translation unit may have been previously parsed. As used herein, a translation unit refers to a representation of the source code to be parsed. The initial portion of a given translation unit is referred to herein as a prefix. By eliminating redundant parsing for translation units having a common prefix, considerable reductions in compilation time may be obtained.

One known technique for exploiting common prefixes to reduce parse time involves the use of so-called precompiled header files. Header files are files added into a translation unit during compilation, and may appear in many different translation units or at several locations in a single translation unit. During compilation, the result of parsing a header file in one translation unit is stored as, for example, a symbol table. If the same translation unit is compiled again, or a different translation unit including the same header file is compiled, the compiler retrieves the stored symbol table rather than reparsing the header file. Precompiled header files are used in many programming environments, including, for example, Borland C++ Version 3.0, available from Borland Int'l, Inc., Scotts Valley, Calif.; ObjectCenter Version 2, available from CenterLine Software, Inc., Cambridge, Mass.; Symantec C++ for Windows and DOS, available from Symantec Corp., Cupertino, Calif.; Microsoft Visual C++ Version 1.0, available from Microsoft Corp., Seattle, Wash.; and the environment described in D. Franklin and B. Legget, "Lucid Energize programming system for Sun SPARC," The C++ Report, vol. 5, no. 6, July-August 1993.

Unfortunately, there are several significant problems which limit the usefulness of precompiled header files in reducing parse time. For example, in many C++ environments the precompiled version of a header file is a representation of the code resulting from macro-expanding the header file. However, the macro-expansion of the header file typically depends on certain options that are supplied to the compiler preprocessor, as well as the contents of the file system when the preprocessor executes. Exemplary preprocessor options in certain implementations of the C and C++ programming languages include the -D, -U, and -I options. If the result of preprocessing the header file using the current options and the current contents of the file system is different from a stored precompiled version of the header file, then it is in general not safe to use that precompiled version of the header file.

It is usually difficult to determine whether any of the stored precompiled versions of a particular header file can be safely used. Even if the preprocessor options are the same as those originally used to create a precompiled version of the header file, and even if the values of preprocessor variables are the same, the contents of the file system may have changed. Exemplary preprocessor variables in the C and C++ programming languages include __DATE__, __TIME__, and __FILE__. If any of the header files directly or indirectly included by a given header file has changed, the macro-expansion of the header file will probably be different. Furthermore, even if the content of an included header file has not changed, if any new files with the same names as the included files have appeared in the file system, the macro-expansion of the header file might be different. It is difficult to determine whether the contents of the file system have changed in a way that renders a precompiled version of a header file unsafe to use. Although tools are available to help users track header file dependencies, such tools are sufficiently complicated that many users do not completely track such dependencies.

The problems with precompiled header files are not limited to those resulting from the use of the preprocessor. For example, if the code in the header file uses a certain term only as a type name, a parse error will occur if the same term is declared as a non-type name before the precompiled version of the header file is incorporated. This is due to the so-called 1½ name space rule described in, for example, M. Ellis and B. Stroustrup, "The Annotated C++ Reference Manual," Addison-Wesley 1990. These and other problems limit the effectiveness of precompiled header files in reducing parse time.

As is apparent from the above, a need exists for improved parsing which more fully exploits common source code prefixes while avoiding the problems associated with the prior art.

SUMMARY OF THE INVENTION

The present invention provides a method and apparatus for parsing source code which utilizes prefix analysis to substantially reduce parse time. In accordance with one aspect of the present invention, a parsing method is provided which includes the steps of identifying a previously-parsed prefix of a source code translation unit; creating a parser in a parser state corresponding to the identified prefix; and parsing a remaining portion of the translation unit using the parser in the parser state corresponding to the prefix.

In accordance with another aspect of present invention, the step of creating a parser includes retrieving stored level-one subtrees corresponding to the top-level statements in the prefix. The level-one subtrees corresponding to the prefix may be stored in the form of a prefix tree along with the text of the top-level source code statements represented by the prefix and a parser delta indicating the effect of the code statements on the parser state.

As a feature of the present invention, the parsing disclosed herein more fully exploits prefix commonality and is easier to implement than available prior art techniques based on, for example, precompiled headers. Parsing efficiency is also significantly improved. For example, the present invention results in reduced parse time when previously-parsed source code exists, and yet is not significantly slower than a conventional prior art parser when there is no previously-parsed source code. In addition, the parsing disclosed herein operates with little or no intervention by or assistance from the user.

The parsing of the present invention is also near-maximal, that is, the time saved when parsing a given translation unit is generally proportional to the time that would have been taken to parse a previously-parsed prefix thereof.

Additional features and advantages of the present invention will become readily apparent by reference to the following detailed description and the accompanying drawings.

DETAILED DESCRIPTION

The present invention may be implemented as, for example, part of a compiler used to process high level source code in any of a number of different programming languages to obtain target code in a desired lower level language. The present invention may also be used to improve parsing in any of a number of other applications, including, for example, interpreters and program analysis. Furthermore, although the following description uses examples in the C++ programming language for illustrative purposes, it should be understood that the present invention may be used to improve parsing in any of a number of other programming environments.

It should also be noted that, although parsing is described below primarily in terms of the generation of parse trees, this is by way of illustration rather than limitation. For example, parsing in accordance with the present invention may also generate other types of structures in which top-level statements of a translation unit correspond to separable pieces of the structure.

Figure 1:
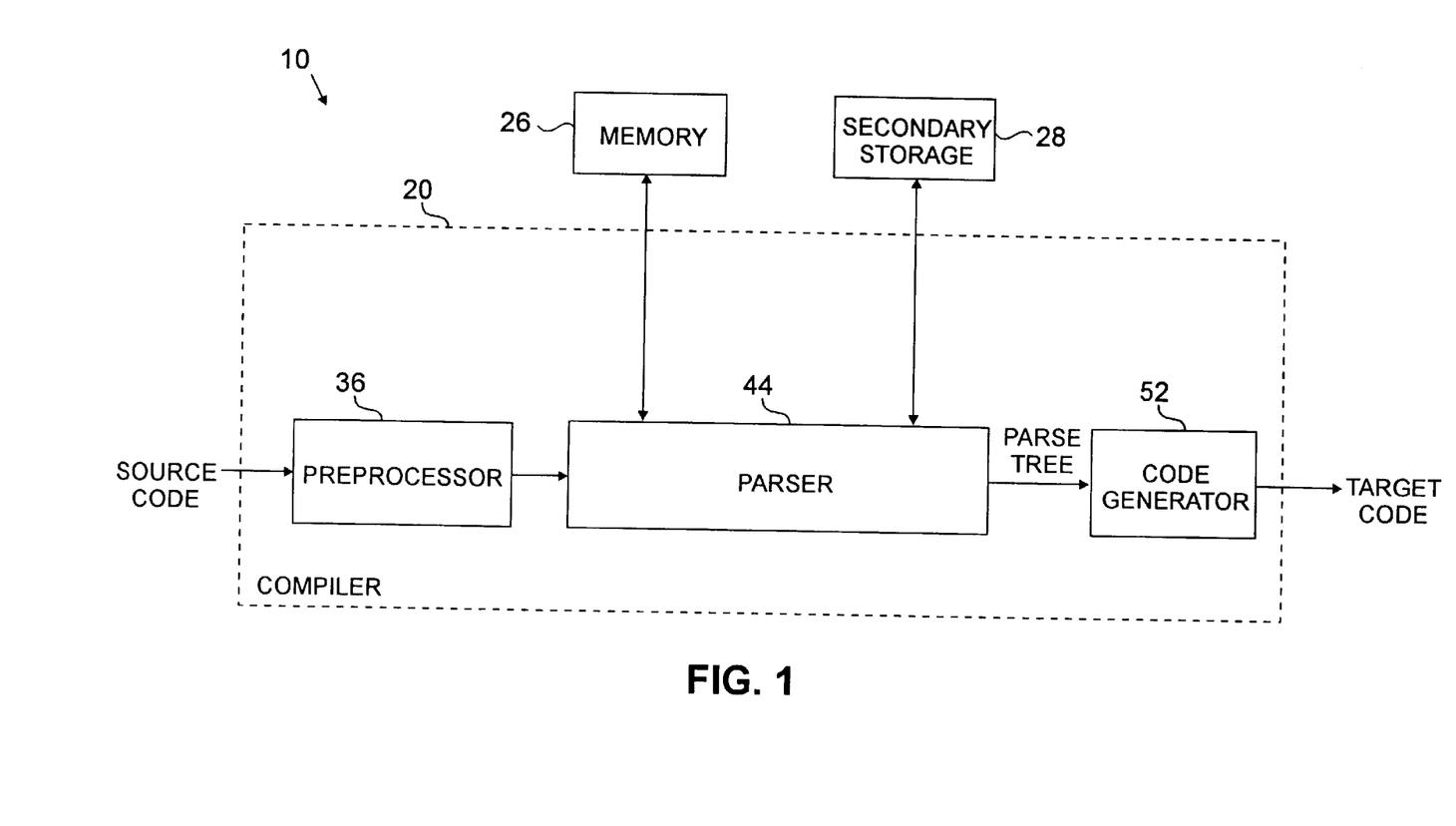
FIG. 1 is a block diagram of an exemplary computer language processing system in which the present invention may be implemented.

FIG. 1 is a block diagram of an exemplary computer language processing system in which the present invention may be implemented. The system 10 includes a compiler 20, memory 26 and secondary storage 28. The compiler 20 receives an input source code file in a high level programming language, such as C++, and generates target code in a desired lower level language. The term source code refers herein to any computer code to be parsed in a given application, and therefore the source code need not be in a high level language. The target code may be, for example, part of a target assembly program which is supplied to an assembler, which is not shown, and converted therein to relocatable machine code. The system may also include a linker, which is not shown, for combining the relocatable machine code with object files such as, for example, library routines. The linker generates absolute machine code suitable for directing operations in a particular microprocessor. The system 10 may be implemented using a computer or other digital data processor programmed to provide the desired operations. The memory 26 may be, for example, an electronic memory in a computer or other digital data processor, and the secondary storage 28 may be, for example, a disk or other memory accessible by the computer performing the language processing. The secondary storage 28 might contain a database.

The exemplary compiler 20 includes a preprocessor 36. The preprocessor 36 generally modifies the source code in accordance with a given set of preprocessor options, and other instructions, also referred to as preprocessor directives, which are contained in the source code. In the C and C++ programming languages, for example, the preprocessor directive "#include" directs the preprocessor to read a specified file and insert it in the source code at the location of the directive. The preprocessor also expands macros into source code statements. In the C and C++ programming languages, macros may be created using the "#define" preprocessor directive. During macro-expansion, the preprocessor replaces any occurrence of a defined macro with its corresponding source code statement or statements. These and other functions of preprocessor 36 are well-known in the art and will typically vary depending upon the programming language. It should be noted that the term "macro-expanded" is also used herein to refer to source code which has been preprocessed and the term should not be construed as limiting preprocessing to only the expansion of macros.

The output of preprocessor 36 is a representation of the source code referred to herein as a translation unit. It should be noted that in language processing systems without a preprocessor, a translation unit can correspond to a non-preprocessed sequence of source code statements. As used herein, the term translation unit is therefore broadly defined to include any string to be parsed. A parser 44 generates a parse tree or other structure from the translation unit. The parser 44 might first perform lexical analysis to break down the source code statements in the translation unit into smaller elements called tokens. The parser could then create a parse tree made up of the tokens in the source code statements. The parser 44 may also perform other functions, including, for example, verifying that a given string of tokens corresponds to a permissible statement in the grammar of the programming environment. The parser 48 may utilize a symbol table in memory 26 or secondary storage 28 for storing token information in a manner well-known in the art. The parse tree created by parser 44 is then used by a code generator 52 to generate target code in a lower level language, which may then be processed in the manner previously described.

It should be understood that the elements of the system of FIG. 1 are exemplary only, and the present invention may be implemented in any of a number of other systems which utilize parsing. As previously noted, these systems include, for example, interpreters and program analyzers. The operation of such systems is generally well-known in the art and therefore will not be further described herein. Additional detail on exemplary language processing systems which utilize parsing may be found in, for example, A. Aho et al., "Compilers: Principles, Techniques and Tools," Addison-Wesley, 1986.

Figure 2:
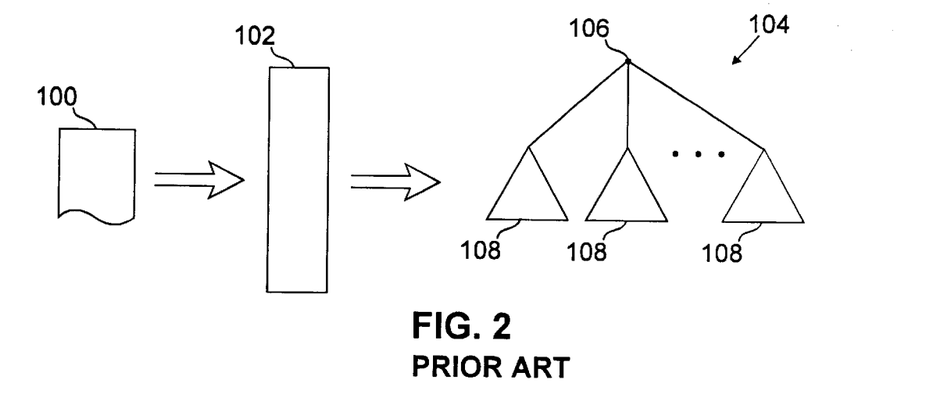
FIG. 2 illustrates an exemplary sequence of steps for generating a parse tree for a source code file in accordance with the prior art.

FIG. 2 illustrates an exemplary sequence of steps for generating a parse tree in accordance with the prior art. An input source code file 100 is preprocessed by, for example, preprocessor 36, to yield a translation unit 102. In this example, the translation unit 102 comprises a preprocessed sequence of source code statements. The translation unit 102 is then parsed in, for example, parser 44 to generate a parse tree 104. The parse tree 104 includes a root node 106 and a number of level-one subtrees 108. A level-one subtree of a given tree refers herein to a subtree whose root node is a child of the root node of the given tree. It should be noted that, in general, any given parse tree may be expressed in terms of a root node and a number of level-one subtrees.

Prior art techniques thus typically generate the parse tree 104 by directly parsing the entire preprocessed translation unit 102. Attempts to reduce parse time in prior art techniques are generally directed to analyzing precompiled header files prior to preprocessing. As a result, the prior art techniques suffer from the numerous problems previously described.

The present invention more fully and efficiently exploits the fact that a significant prefix of a given translation unit might have been previously parsed during compilation of the same or a different source code input file. The following is an exemplary source code file in a C++ programming environment:

```
#include <X.h>
void f() {
  // ...
}
```

After this source code file is preprocessed and parsed, the definition of function f() might change. If the file is then parsed again, the prefix of the translation unit corresponding to the macro-expansion of X.h will often be the same, and will thus have been previously parsed. Further, if at a later time the following source code file is preprocessed and parsed:

```
#include <X.h>
void g() {
  // ...
}
``` the translation unit prefix for the latter source code file will often be the same as that of the former. The parsing of the present invention exploits such common prefixes in a significantly more efficient manner than, for example, the prior art precompiled header techniques.

The present invention is based in part on recognition that it is very difficult to determine before preprocessing whether a set of source code has been previously parsed. Many of the problems of prior art techniques, such as precompiled header files, stem from a failure to recognize and address this difficulty. In accordance with the present invention, this difficulty is overcome by, for example, first completely preprocessing the source code to be parsed, and then performing prefix analysis to determine if any portion of the preprocessed source code has been previously parsed.

In the embodiments described below, it will be assumed that top-level source code statements in the translation unit correspond to level-one subtrees in the parse tree of the translation unit. There will thus be an a priori correspondence between top-level statements and portions of the parse tree. For example, the parse tree for the following translation unit:

```
class T {
  // ...
};
void add1 (int& n) {
  ++n;
}
extern int i;
``` includes three level-one subtrees, corresponding to the definition of T, the definition of add1, and the declaration of i. It will be readily understood by those skilled in the art, however, that the present invention may also be implemented using parse trees for which top-level source code statements are represented by lower level subtrees. For example, an a priori correspondence between top-level source code statements and portions of the parse tree could be achieved by assigning level-two subtrees to certain top-level statements.

Figure 3A:
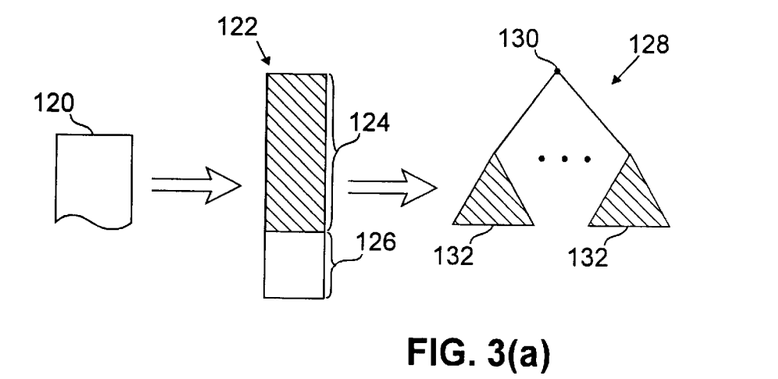
FIGS. 3(a) and 3(b) illustrate an exemplary sequence of steps for generating a parse tree for a source code file in accordance with the present invention.
Figure 3B:
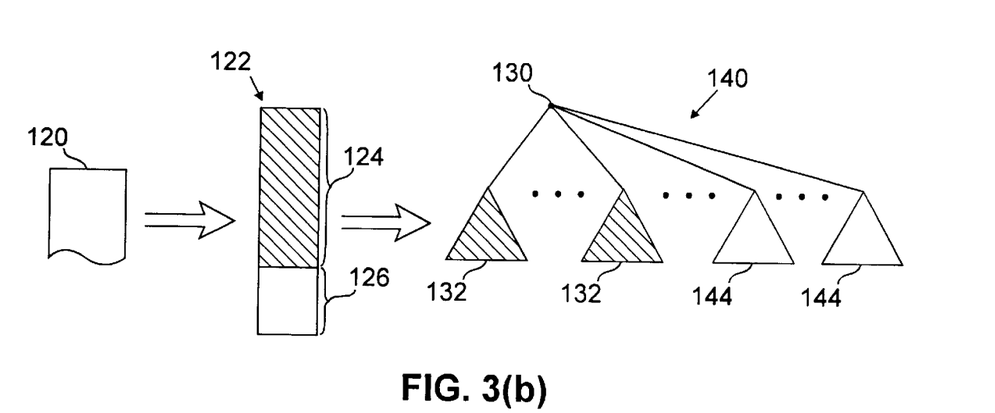

FIGS. 3(a) and 3(b) illustrate an exemplary sequence of steps for generating a parse tree in accordance with the present invention. Referring to FIG. 3(a), an input source code file 120 is preprocessed in the manner previously described to generate a translation unit 122. A prefix 124 of the translation unit 122 is then identified as having been previously parsed. As used herein, a prefix refers to an initial portion of a translation unit. The remainder 126 of the translation unit 122 is a portion which has not been previously parsed. For maximum efficiency, the prefix 124 should be the longest prefix of the translation unit 122 which is the same as a prefix of a translation unit previously parsed. Such a prefix will be referred to herein as a maximal prefix. The process of identifying a maximal or near-maximal prefix will be referred to herein as prefix analysis. The process of utilizing an identified prefix to reduce parse time will be referred to herein as prefix optimization.

A partial parse tree 128 with root node 130 is then created by retrieving the level-one subtrees 132 corresponding to a previous parsing of the prefix 124. The partial parse tree 128 may be stored in, for example, the memory 26 or secondary storage 28 of FIG. 1 as a data structure referred to as a prefix tree and described in greater detail below. Referring now to FIG. 3(b), a complete parse tree 140 for the translation unit 122 is generated by using a parser in a state corresponding to the prefix 124 to parse the remainder 126 of the translation unit 122. A parser in a state corresponding to a prefix refers to a parser in a state it would be in after parsing that prefix. This parser then generates the level-one subtrees 144 corresponding to the remainder 126 of the translation unit 122. The complete parse tree 140 is generated by adding the level-one subtrees 144 for the remainder 126 to the level-one subtrees 132 for the prefix 124.

Figure 4:
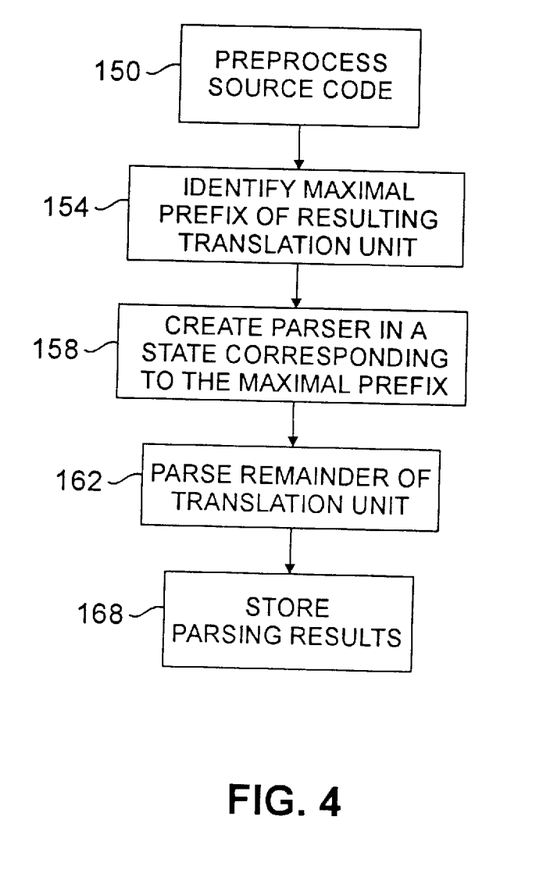
FIG. 4 is a flow diagram illustrating an exemplary parsing method in accordance with the present invention.

FIG. 4 shows a flow diagram of the exemplary parsing method of the present invention described above in conjunction with FIGS. 3(a) and (b). The exemplary parsing method includes the following steps: (1) preprocessing the source code (operation block 150); (2) identifying the maximal prefix of the resulting translation unit corresponding to top-level source code statements that have been previously parsed (operation block 154); (3) creating a parser in the parser state that the parser would be in after parsing the portion of the translation unit corresponding to the maximal prefix (operation block 158); (4) parsing the remaining source code in the translation unit using the parser created in step (3) (operation block 162); and (5) storing the results of the parsing for use in subsequent repetitions of the parsing method (operation block 168). The parser state which is determined in operation block 158 of the exemplary parsing method of FIG. 4 will be described in greater detail below.

It should be noted that performing the prefix analysis on the code after preprocessing eliminates the need for users to track header file dependencies. A tradeoff is that the parser always preprocesses all source code, even the source code for prefixes that have already been parsed. As will be demonstrated below, the use of a fast preprocessor can substantially reduce the time spent preprocessing in the above exemplary method. It should also be noted that to determine the maximal prefix in operation block 154, it may be necessary to use a data structure which is stored across a number of executions of the parsing method. Such a data structure is described in detail below. In alternative embodiments, a near-maximal prefix or a prefix of a shorter length could be identified instead of a maximal prefix.

The exemplary method of the present invention also has the desirable property that if a comment is changed after a given set of source code has been parsed, a subsequent parse of that source code is performed very quickly, because changing a comment typically does not affect the text of the corresponding translation unit. This is due to the fact that in certain programming languages, such as C and C++, preprocessing generally replaces each comment with a single space.

The parser state will now be described in greater detail. The following description will use s to designate a sequence of top-level source code statements. The parser state after s is defined herein as the minimal amount of information needed to create a parser that will correctly parse any source code following s. The step of creating a parser in a particular state thus generally involves retrieving the corresponding information from, for example, memory 26 or secondary storage 28 of FIG. 1. It should be noted that this definition of parser state depends on the type of parse trees being generated. For the type of parse trees typically generated in most programming environments, the parser state includes information about the names declared in s. For example, the parser state after parsing the following C++ source code:

```
class T {
public:
  void f();
};
void add1 (int& n) {
  float g;
  ++n:
}
extern int i;
``` might include the following information:

Type names T, add1, and i are declared at global scope; nontype name f is declared in T's inner scope.

The parser state need not include any information about the names n or g in the above code because nothing about these names can affect the parsing of any source code following the exemplary sequence of code statements.

If s is expressed as the concatenation of the top-level source code statements $s_1, s_2, \ldots, s_n$, then the parser state after s is $(\Delta_n{}^o \ldots {}^o\Delta_2{}^o\Delta_1)$ (0) where (0) is the initial parser state and the parser delta $\Delta_1$ represents the effect of $s_i$ on any given parser state. For example, the following is the parser delta for the definition of T shown in the above code:

Add type name T to the global scope; add nontype name f to T's inner scope.

A parser in the state after s can be created by first creating a parser in the initial state and then applying all the parser deltas to that parser.

Figure 5:
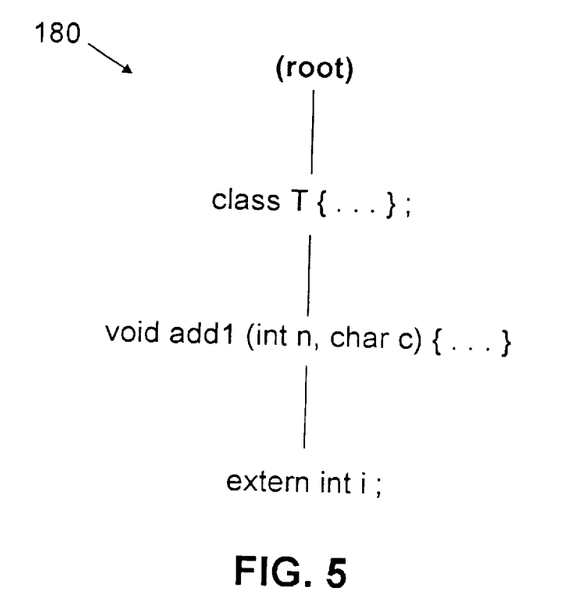
FIGS. 5 and 6 show prefix trees generated in accordance with the present invention for exemplary sequences of C++ source code statements.
Figure 6:
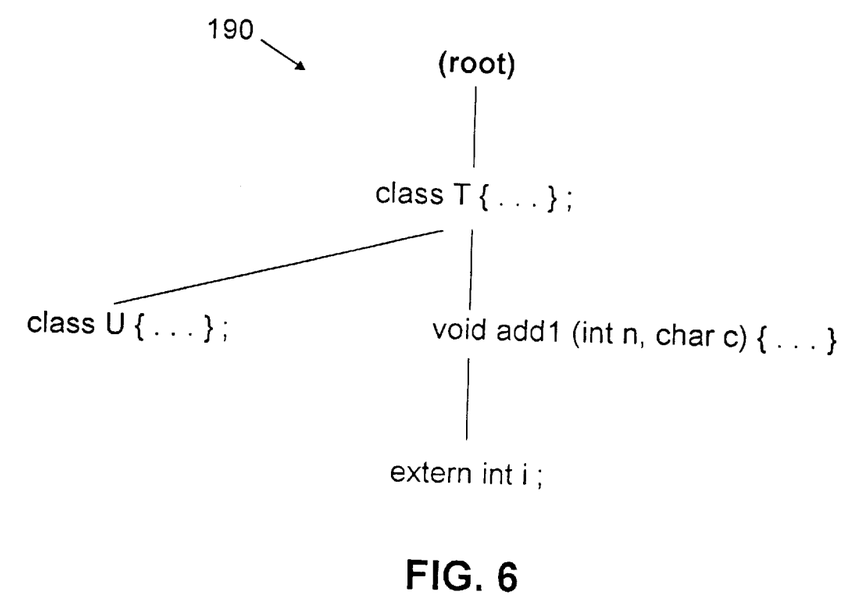

An exemplary data structure for storing information about previously-parsed code will now be described. This data structure is referred to herein as a prefix tree. In the prefix tree of the present invention, each node other than the root node represents a top-level source code statement. The path from the root node of the prefix tree to any other node therein represents the translation unit formed by concatenating the source code statements represented by the nodes along that path. The path from the root node to itself represents the empty translation unit. Each node n in an exemplary prefix tree contains the following information:

$TEXT_n$—the text of the top-level statements s represented by node n $TREE_n$—the level-one subtree that represents s $\Delta_n$—the parser delta for s FIG. 5 shows an exemplary prefix tree 180 for the sequence of C++ source code statements listed in the above discussion of parser state. The prefix tree 180 shows only the values of $TEXT_n$. FIG. 6 shows an exemplary prefix tree 190 for the following translation unit, showing only the values of $TEXT_n$:

```
class T {
public:
  void f();
};
class U {
public:
  void g();
};
```

The actual number of prefix trees used, and which prefix trees are used by a particular parser, will generally depend upon the programming environment in which the parser is used. However, if the same prefix tree is used for a series of parses, the prefix tree may grow arbitrarily large. It would therefore be potentially inefficient to read the entire prefix tree at the start of every parse that uses it. This problem is solved in accordance with the present invention by using, for example, a disk-based prefix tree in which only the nodes which must be examined in a particular parse are read in from disk or other secondary storage for that parse.

To further improve the parsing efficiency of the present invention, the prefix trees can be stored in a compressed form. For example, to minimize the time spent reading the $TEXT_n$ information for all the nodes that must be examined while parsing, $TEXT_n$ can be stored in compressed form. One possible technique for achieving high compression involves using a compressor in the state s resulting from having compressed all the ancestors of node n, starting from the root node. Unfortunately, this technique may adversely affect the efficiency of the parsing method. For example, in the exemplary parsing method of the present invention, it might be necessary to decompress all the children of a given node. If each child was compressed using a compressor in state s, it will then be necessary to set the state of a decompressor to s for each child. For many compression techniques, it is difficult to efficiently set the state of a decompressor to a noninitial state s.

An alternative technique for compressing the prefix trees of the present invention involves compressing each $TEXT_n$ individually. Unfortunately, because the average size of a top-level statement in well-written C++ code is small (typically about 200 characters), compressing each $TEXT_n$ individually might not achieve a sufficiently high compression rate.

Another alternative compression technique involves altering the definition of a prefix tree to allow every node in the prefix tree to represent a contiguous sequence of top-level statements. For example, every node could represent as many top-level statements as is necessary to give the tree the property that no node has only one child. Thus, if a given node had only one child, that child could be merged with the given node. When attempting to identify the longest prefix that has already been parsed, if a prefix ends within a sequence of statements represented by a node, that node can be split before continuing the prefix analysis.

Such an approach may be difficult to implement efficiently, however. First, when a node is examined, one cannot simply read in the entire compressed text stored at that node, because there would usually be no upper bound on the size of that text. Instead, fixed-size portions of the compressed text could be read in one at a time, decompressing each portion as it is read in. In addition, the process of splitting a node may be problematic. For example, assume a given node n representing the decompressed text $a=a_1a_2$ is to be split between $a_1$ and $a_2$, and that c represents the compression of a. The compressions $c_1$ and $c_2$ of $a_1$ and $a_2$, respectively, must then be computed. Computing $c_1$ is typically not difficult because $c_1$ is simply a prefix of c. The compression $c_2$, however, is in general not the remaining suffix of c. To compute $c_2$ one might first compute the uncompressed $a_2$, and then compress it. However, computing $a_2$ requires reading in from memory or secondary storage the entire compressed text stored at n, which, as previously stated, might be inefficient.

A preferred compression approach, which addresses many of the above-identified compression problems, may be implemented as follows. Every node in the prefix tree is used to represent a contiguous sequence of some constant number k of top-level source code statements. It should be noted that for any node representing the end of a translation unit, it might be necessary to represent fewer than k source code statements at that node. One suitable value of k is 50. Existing fast compression algorithms can be used to efficiently compress about 50 top-level statements to achieve up to about a 70% compression rate in practice. This rate is approximately that achieved in practice by compressing the entire translation unit at once. Allowing each prefix tree node to represent up to 50 top-level source code statements may mean that the maximal previously-parsed prefix might not be found using the exemplary method described above. Instead, the method might find a prefix of top-level statements that contains at most 50 statements fewer than the maximal prefix. However, assuming a constant upper bound on the number of characters in a top-level statement, the parsing of the present invention will still produce a near-maximal prefix. In addition, representing 50 statements per node might reduce several constant factor overheads in a practical implementation of the above-described exemplary parsing method. Of course, values of k other than 50 may also be used.

Exemplary techniques for parsing a given translation unit prefix will now be described. To construct the nodes in the prefix tree, a function is needed that can parse at most k top-level statements from the text remaining in a given translation unit. Such a function can then be called repeatedly in order to parse the entire translation unit. More specifically, define s as a sequence of top-level statements, P as a parser in the state after s, and e as a text string. Assume that e, when parsed in the context of s, is error free, and define t as the first k statements in e. A function parseprefix(P, e) may be used which returns the triple (len, T, Δ), where len is the number of characters in t, T is the prefix tree representing t, and Δ is the parser delta for t. The function parseprefix(P, e) may be implemented in any of a number of ways to return these values. Furthermore, when the function parseprefix(P, e) returns, P is in the state after the concatenation of s and t. For illustrative purposes, the remainder of this description will assume that e, when parsed in the context of s, is error free. It will be readily apparent to those skilled in the art that the present invention also encompasses translation units which do not conform to this assumption.

The above-described parsing may be implemented using the following set of exemplary processing steps:

```
    parse (t, T) is
 1      e ← macro-expansion of t
 2      P ← parser in initial state
 3      n ← root of T
 4      while e is not the empty string
 5          if there is a child m of n such that TEXT_m is a
            prefix of e
 6              apply Δ_m to P
 7              remove the prefix TEXT_m from e
 8              n ← m
 9          else
10              (len, T, Δ) ← parseprefix(P, e)
11              create a new node m = (e_{0..len-1}, T, Δ)
12              make m a child of n
13              remove the prefix TEXT_m from e
14              n ← m
15      return n
```

The operation of the above exemplary implementation is as follows. First a given translation unit is macro-expanded, or preprocessed, and then a parser in the initial state is created. The function parse(t, T) then begins at the root of the prefix tree T and proceeds down the tree. At each node in the prefix tree, the function looks for a child whose text matches a prefix of the text e remaining in the translation unit. If there is such a child, the function moves to it, strips that prefix from the remaining text, and applies the parser delta to the parser. If there is no such child, the function parse(t, T) calls the function parseprefix(P, e) to parse a prefix of the remaining test. The function parse(t, T) then creates a prefix tree node with the information returned by the function parseprefix(P, e), makes it a child of the current node, and moves to that child. The function parse(t, T) is completed when there is no more text remaining in the translation unit.

As mentioned above, a preferred embodiment of the present invention reads from disk or other secondary storage only those nodes of the prefix tree that must be examined, which in the function parse(t, T) occurs on line 5. In addition, the memory used to hold a node should generally be freed as soon as the function leaves that node on lines 8 and 14.

In the above detailed implementation of parse(t, T), the entire translation unit generally must be expanded in memory. If it is not feasible to expand the entire translation unit in memory, the translation unit could be expanded into a file. Such an approach might increase the time spent by the function parse(t, T) in performing file input and output. Alternatively, the translation unit could be expanded in memory one piece at a time, in a manner well-known in the art.

It should be noted that the above implementation of the parsing method returns the last node visited in the prefix tree. Given a node n in a prefix tree, the parse tree of the corresponding translation unit can be reconstituted, or reconstructed, using the following exemplary function:

```
reconstitute (n) is
  R ← root of an empty parse tree
  while parent(n) ≠ nil
    for each level-one subtree t associated with n in
    reverse order
      make t the leftmost child of R
    n ← parent (n)
  return R
```

The operation of the exemplary function reconstitute(n) is as follows. First a parse tree is created consisting only of a root node. Then beginning at a given node n the function proceeds up the parse tree. At each node, copies of the level-one subtrees associated with that node are retrieved, and then spliced into, or added to, the parse tree under construction. It is important to ensure that the level-one subtrees are spliced in the correct order.

The complexity of the above exemplary processing steps parse(t, T) will now be analyzed. Running time will be considered first. The time required to preprocess a given translation unit is defined as O(L), where L is the number of characters in the macro-expanded translation unit, and the notation O() designates "on the order of" the quantity enclosed in the parentheses. The function parseprefix(P, e) runs in time O(len), where len is the first value in the triple (len, T, Δ) returned by parseprefix(P, e). The time needed to apply parse delta $\Delta_m$ to parser P is assumed to be proportional to the number of characters in $\text{TEXT}_m$.

A node m in a prefix tree is examined if the value of $\text{TEXT}_m$ is examined on line 5 of parse(t, T). $X_1$ is defined as the number of nodes examined by the processing steps, and $X_2$ as the maximum number of characters in any top-level source code statement contained in the translation unit being parsed or represented anywhere in the prefix tree. $X_3$ is defined as the sum of all the values of len returned by calls to the function parseprefix(P, e). It should be noted that the modifications to the variable e in parse(t, T) can be implemented with constant-time index manipulations. If this is the case, the worst-case running time of parse(t, T) is $O(L+X_1X_2+X_3)=O(L+X_1X_2)$. In practice, both $X_1$ and $X_2$ are typically bounded by a constant. Therefore, the running time of parse(t, T) may be expressed as O(L), or $O(X_3)$ not counting preprocessing time. This result is asymptotically optimal for a parsing method that always preprocesses the entire translation unit.

The memory space required for storing parsing results will now be considered. The memory space needed to hold the prefix tree T and parser delta Δ returned by parseprefix(P, e) are given by O(len), where len is the first value in the triple (len, T, Δ) returned by parseprefix(P, e). If, immediately before lines 8 and 14 of parse(t, T), the memory space needed to hold the node pointed to by n is freed, then the space used by parse(t, T) in the worst case is $O(L+X_2)$. If file-based or one-piece-at-a-time macro expansion as explained above is also used, then the space used by parse(t, T) is $O(X_2)$, which for well-written code is generally the asymptotically optimal $O(X_3)$.

A stored prefix tree might be shared by many executions of the parse(t, T) and reconstitute(n) functions. In general, however, only one execution at a time should access the prefix tree. To prevent conflicts, the well-known technique of explicitly locking and unlocking the file containing the stored prefix tree may be used. Alternatively, the prefix tree could be stored in a database, thereby providing serialization of accesses without having to do explicit locking. More specifically, the code for parse(t, T) might be modified as follows:

```
parse(t,T) is
  begin read-write transaction
  // . . .
  commit transaction
```

It should be noted that using a database may adversely affect the efficiency of the parsing method. In many databases, the memory used to hold a retrieved object cannot be freed until the current transaction is committed or aborted. Thus, in the function parse(t, T) the memory used to hold a node may not be freed as soon as the function leaves that node.

One way to solve this problem is to commit and restart the transaction after examining every k nodes, for some constant k. There are several problems with this approach, however. First, it might be difficult to implement. Second, the resulting processing steps might be noticeably slower. Finally, the resulting processing steps serialize incorrectly—that is, it is possible for two overlapping executions $e_1$ and $e_2$ of parse(t, T) to have an effect that is different than the effect of executing $e_1$ followed by $e_2$ or $e_2$ followed by $e_1$.

The performance results of an exemplary implementation of the present invention will now be described. The parsing method described in detail above was incorporated into a language processing system including an existing C++ parser running on a Sun IPX workstation. The existing parser produces ALF trees as described in the above-cited article by R. Murray. For comparison purposes, the parser was profiled and optimized with the prefix optimization of the present invention both turned off and turned on. The parser operated on a number of source code files which, when macro-expanded, produced translation units of varying sizes. Each source code file was first (1) parsed with the prefix analysis optimization turned off, then (2) parsed with the optimization turned on, and then (3) parsed again with the optimization turned on.

Figure 7:
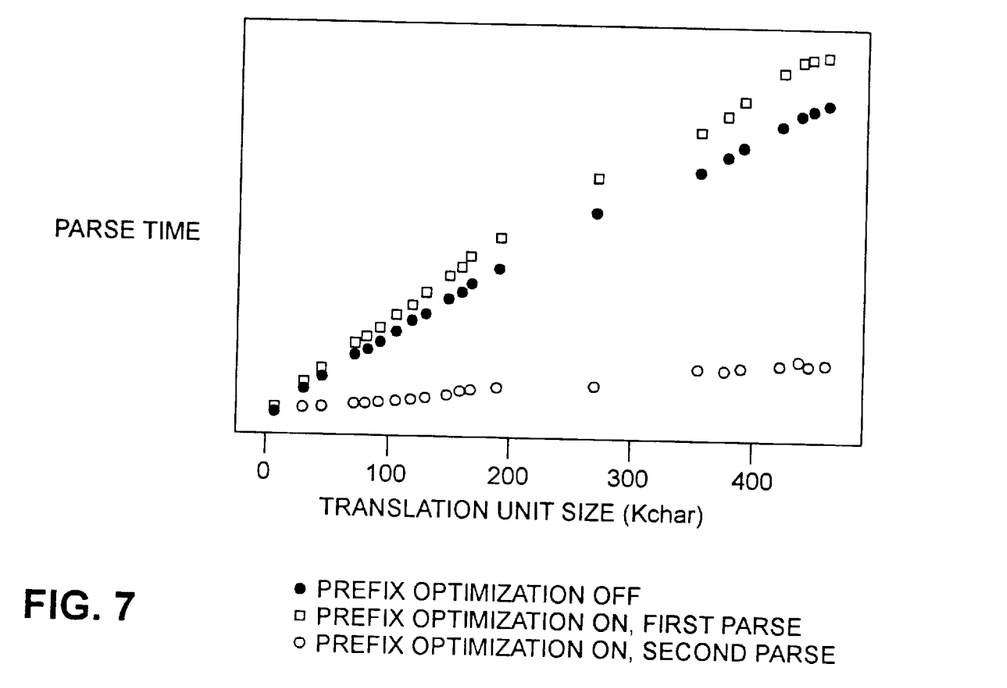
FIG. 7 is a plot of parse time as a function of translation unit size in a language processing system in accordance with the present invention.

FIG. 7 shows the performance results in the form of a plot of parse time as a function of translation unit size. The plot is intended to illustrate relative improvement in parse time, and therefore the vertical axis does not include specific time units. The translation unit size is specified in Kchar, or thousands of characters. It should be noted that the first time that a file is parsed with the prefix optimization of the present invention turned on, the parser is slower than with the optimization turned off. This behavior is as expected in that with the optimization turned on, the parser must spend extra time building and storing the prefix tree. The second time a file is parsed with the optimization turned on, however, the parse time is significantly less than that of either of the previous parses. The parser determines by using the stored prefix tree that none of the translation unit needs to be parsed again. In this example, for large translation units on the order of 470 Kchar, the first parse with the optimization turned on is about 15–18% slower than parsing with the optimization turned off, and the second parse with the optimization turned on is about 80–82% faster than parsing with the optimization turned off.

Figure 8:
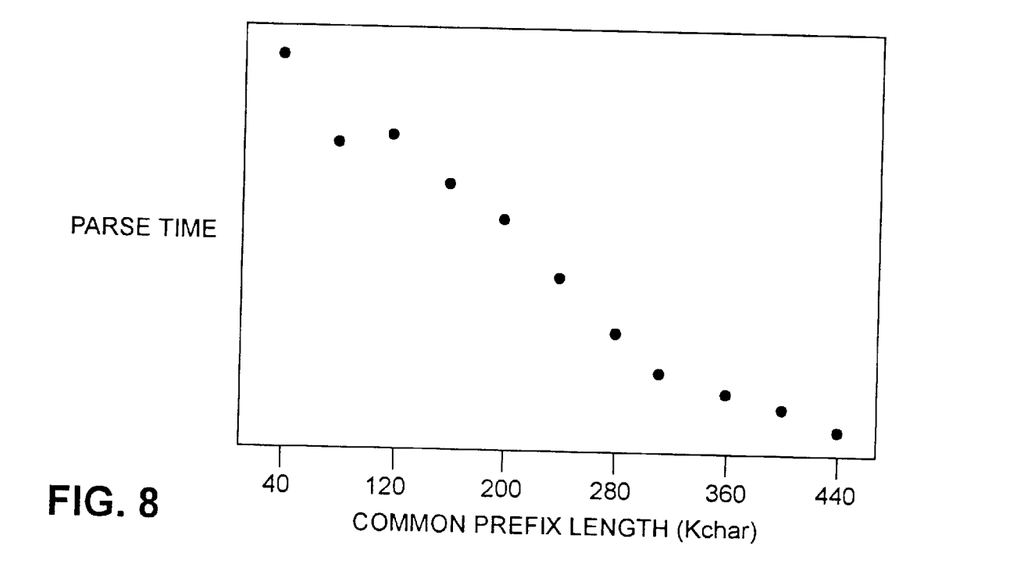
FIG. 8 is a plot of parse time as a function of common prefix length in a language processing system in accordance with the present invention.

FIG. 8 shows the performance results in the form of a plot of parse time as a function of common prefix length. The plot shows the effect on parse time if a change is made somewhere in the translation unit, and then the translation unit is parsed again with the optimization turned on. To generate this plot, a file that produced a large (470 Kchar) translation unit was chosen, one noncommentary change to the code was made in a file that was directly or indirectly included by the chosen file, and the chosen file was then reparsed. The plot of FIG. 8 shows the resulting parse time as a function of the distance, in thousands of characters, of the change from the beginning, or top, of the translation unit. This distance corresponds to the common prefix length. As in FIG. 7, the plot is intended to show relative improvement in parse time, and therefore no specific time units are shown on the vertical axis. Notice that the parse time varies with the common prefix length. This result is as expected in that the farther the change from the beginning of the translation unit, the less code the parser actually has to parse. In particular, if the change is made in the file specified to the parser, rather than one of the included files, reparsing is very fast.

FIGS. 7 and 8 demonstrate that the parsing of the present invention can result in a substantial decrease in the time required to parse a given source code file.

The present invention may be implemented as an apparatus which includes, for example, a preprocessor, means for identifying a previously-parsed prefix of a translation unit, and a parser in a parser state corresponding to the prefix. The means for identifying a prefix may be, for example, a computer or other digital data processor programmed to provide the above-described exemplary prefix identification operations. The apparatus may also include means for storing parsing results to be used for subsequent parsing. These means for storing may include, for example, the memory 26 or secondary storage 28 of FIG. 1.

It should be understood that the above-described embodiments of the present invention are exemplary only. Many variations may be made in the arrangements shown, including, for example, the type of programming language, the type of parse trees or other structures generated by the parser, the manner of storing parse trees for previously-parsed prefixes, the application in which the parsing is used, and the hardware used to implement the parsing. These and other alternatives and variations will be readily apparent to those skilled in the art, and the present invention is therefore limited only by the appended claims.

We claim:

1. A method of parsing source code in a language processing system, said method comprising the steps of:

analyzing a translation unit of said source code to identify a previously-parsed prefix of the translation unit;

creating a parser in a parser state that said parser would be in after parsing said prefix; and parsing a remainder of said translation unit after said prefix using said parser in said parser state, regardless of whether portions of said remainder are unchanged since a previous parse.

2. The method of claim 1 furthing including the step of preprocessing said source code to generate said translation unit.

3. The method of claim 1 further including the step of storing results thereof for use in subsequent parsing.

4. The method of claim 1 wherein said step of creating said parser in said parser state corresponding to said prefix further includes the step of retrieving a number of level-one subtrees corresponding to said prefix.

5. The method of claim 1 wherein said step of parsing a remainder of said translation unit after said prefix includes generating a number of level-one subtrees for said remainder of said translation unit.

6. The method of claim 1 wherein said method further includes the step of combining level-one subtrees corresponding to said prefix of said translation unit with level-one subtrees corresponding to said remainder of said translation unit.

7. The method of claim 1 wherein said steps of identifying said prefix and creating a parser in a state corresponding to said prefix further includes the step of retrieving a stored prefix tree representing said parser state.

8. The method of claim 7 wherein said prefix tree includes a number of nodes representing top-level statements in said source code.

9. The method of claim 8 wherein each node in said prefix tree further includes:

text corresponding to a sequence of top-level statements in said source code represented by said node;

a level-one subtree corresponding to said sequence of top-level statements; and a parser delta for said sequence of top-level statements.

10. The method of claim 8 wherein said step of creating said parser in said parser state further includes the steps of:

creating a parser in an initial state; and applying a parser delta for each of said nodes in said prefix tree to said parser in said initial state.

11. The method of claim 8 wherein each node of said prefix tree represents a contiguous sequence of top-level statements.

12. The method of claim 1 wherein said prefix was parsed in a previous parse of a second translation unit.

13. The method of claim 1 wherein said prefix was parsed in a previous parse of a different version of said translation unit.

14. An apparatus for processing source code in a language processing system, said apparatus comprising:

means for analyzing a translation unit of said source code to identify a previously-parsed prefix of the translation unit; and a parser configured in a parser state that said parser would be in after parsing said prefix, wherein said parser in said parser state is adapted to parse a remainder of said translation unit after said prefix, regardless of whether portions of said remainder are unchanged since a previous parse.

15. The apparatus of claim 14 further including means for storing results of parsing performed by said parser for use in subsequent parsing.

16. The apparatus of claim 14 wherein said parser in said parser state is created from a number of level-one subtrees corresponding to said prefix.

17. The apparatus of claim 14 wherein said parser state is stored as a prefix tree.

18. The apparatus of claim 17 wherein said prefix tree includes a number of nodes representing top-level statements in said source code.

19. The apparatus of claim 18 wherein each node in said prefix tree further includes:

text corresponding to a sequence of top-level statements in said source code represented by said node;

a level-one subtree corresponding to said sequence of top-level statements; and a parser delta for said sequence of top-level statements.

20. The apparatus of claim 18 wherein each node of said prefix tree represents a contiguous sequence of top-level statements.

21. The apparatus of claim 14 wherein said source code is in a C programming language.

22. The apparatus of claim 14 wherein said source code is in a C++ programming language.

23. The apparatus of claim 14 wherein said prefix was parsed in a previous parse of a second translation unit.

24. The apparatus of claim 14 wherein said prefix was parsed in a previous parse of a different version of said translation unit.

25. The apparatus of claim 14 further including a preprocessor for preprocessing said source code to generate said translation unit.

* * * * *